US009888545B2

(12) United States Patent
Casper et al.

(10) Patent No.: US 9,888,545 B2
(45) Date of Patent: Feb. 6, 2018

(54) HIGH INTENSITY LED ILLUMINATION DEVICE

(71) Applicant: Ephesus Lighting, Inc., Syracuse, NY (US)

(72) Inventors: Joseph R. Casper, Syracuse, NY (US); Christopher D. Nolan, Syracuse, NY (US); Joseph J. Witkowski, Syracuse, NY (US); Jeff R. Shuster, Syracuse, NY (US); Brian M. Wilson, Syracuse, NY (US)

(73) Assignee: Ephesus Lighting, Inc., Syracuse, NY (US)

( * ) Notice: Subject to any disclaimer, the term of this patent is extended or adjusted under 35 U.S.C. 154(b) by 0 days.

(21) Appl. No.: 14/573,584

(22) Filed: Dec. 17, 2014

(65) Prior Publication Data
US 2015/0167937 A1   Jun. 18, 2015

Related U.S. Application Data

(60) Provisional application No. 61/917,030, filed on Dec. 17, 2013.

(51) Int. Cl.
*F21V 5/00* (2015.01)
*H05B 33/08* (2006.01)
(Continued)

(52) U.S. Cl.
CPC ......... *H05B 33/089* (2013.01); *F21V 5/007* (2013.01); *F21V 15/012* (2013.01); *F21V 23/02* (2013.01);
(Continued)

(58) Field of Classification Search
CPC .. F21V 29/22; F21V 29/2206; F21V 29/2212; F21V 29/2262; F21V 29/2293;
(Continued)

(56) References Cited

U.S. PATENT DOCUMENTS 6,962,423 B2 * 11/2005 Hamilton ............... B64D 47/08
362/12
8,227,960 B2     7/2012 Huang
(Continued)

FOREIGN PATENT DOCUMENTS

WO    WO-2013090536 A1    6/2013

OTHER PUBLICATIONS

A Remaining Useful Life Prediction Method Based on Condition Monitoring for LED Driver. Proceedings of the IEEE 2012 Prognostics and System Health Management Conference (PHM-2012 Beijing) (2012): 1-5. Web.*

(Continued)

*Primary Examiner* — Sean Gramling
*Assistant Examiner* — Gerald J Sufleta, II
(74) *Attorney, Agent, or Firm* — Fox Rothschild LLP

(57) ABSTRACT

A lighting device includes a light emitting diode (LED) structure having LEDs, a housing, and a power supply. The housing receives and secures the LED structure, and includes a body portion that comprises a heat sink for the LED structure, and a shroud that at least partially shields the LED structure. The heat sink comprises various fins that extend away from the LED module in a direction that is perpendicular to a width of the LED structure.

23 Claims, 12 Drawing Sheets

(51) Int. Cl.

| | | |
|---|---|---|
| *F21V 15/01* | (2006.01) | |
| *F21V 29/50* | (2015.01) | |
| *F21V 23/02* | (2006.01) | |
| *H05B 37/02* | (2006.01) | |
| *F21V 29/507* | (2015.01) | |
| *F21V 3/00* | (2015.01) | |
| *F21V 23/00* | (2015.01) | |
| *F21W 131/406* | (2006.01) | |
| *G02B 27/30* | (2006.01) | |
| *F21V 5/04* | (2006.01) | |
| *F21V 21/30* | (2006.01) | |
| *F21W 101/02* | (2006.01) | |
| *F21W 131/105* | (2006.01) | |
| *F21Y 105/10* | (2016.01) | |
| *F21Y 115/10* | (2016.01) | |

(52) U.S. Cl.
CPC ............ *F21V 29/50* (2015.01); *F21V 29/507* (2015.01); *H05B 33/0845* (2013.01); *H05B 33/0848* (2013.01); *H05B 33/0851* (2013.01); *H05B 33/0854* (2013.01); *H05B 33/0857* (2013.01); *H05B 33/0869* (2013.01); *H05B 33/0872* (2013.01); *H05B 37/0218* (2013.01); *F21V 3/00* (2013.01); *F21V 5/04* (2013.01); *F21V 21/30* (2013.01); *F21V 23/004* (2013.01); *F21V 23/006* (2013.01); *F21W 2101/02* (2013.01); *F21W 2131/105* (2013.01); *F21W 2131/406* (2013.01); *F21Y 2105/10* (2016.08); *F21Y 2115/10* (2016.08); *G02B 27/30* (2013.01)

(58) Field of Classification Search
CPC ............... F21V 29/50; F21V 29/60; F21V 29/70–29/83; F21V 29/002; F21V 29/004; F21V 29/02; H05B 33/089
USPC ................................................ 362/294, 617
See application file for complete search history.

(56) References Cited

U.S. PATENT DOCUMENTS

| | | | |
|---|---|---|---|
| 8,371,717 B2 | 2/2013 | Lai | |
| 8,573,801 B2 | 11/2013 | Artsyukhovich et al. | |
| 8,760,058 B2 | 6/2014 | Song et al. | |
| 8,841,859 B2 | 9/2014 | Chemel et al. | |
| 2006/0164836 A1* | 7/2006 | Suehiro | F21K 9/00 362/294 |
| 2009/0040470 A1* | 2/2009 | Fukui | G03B 21/16 353/58 |
| 2009/0067172 A1* | 3/2009 | Inoue | F21S 8/026 362/240 |
| 2010/0225241 A1 | 9/2010 | Maehara et al. | |
| 2010/0277076 A1 | 11/2010 | Tracy et al. | |
| 2011/0062872 A1 | 3/2011 | Jin et al. | |
| 2011/0095690 A1 | 4/2011 | Sagal | |
| 2012/0033419 A1* | 2/2012 | Kim | F21S 8/026 362/235 |
| 2012/0087118 A1* | 4/2012 | Bailey | F21V 29/745 362/235 |
| 2012/0153837 A1 | 6/2012 | Park et al. | |
| 2012/0235579 A1 | 9/2012 | Chemel et al. | |
| 2012/0261105 A1 | 10/2012 | Lin et al. | |
| 2013/0003360 A1* | 1/2013 | Igaki | F21V 31/03 362/184 |
| 2013/0033881 A1* | 2/2013 | Terazawa | F21K 9/1375 362/382 |
| 2013/0077307 A1* | 3/2013 | Yamamoto | F21S 8/026 362/244 |
| 2014/0159583 A1 | 6/2014 | Bollmann | |
| 2014/0204584 A1* | 7/2014 | Wu | F21V 29/74 362/294 |
| 2015/0054410 A1 | 2/2015 | Sanders et al. | |

OTHER PUBLICATIONS

International Search Report dated Apr. 29, 2013 for PCT/US2012/069442, international filing date Dec. 13, 2012.

* cited by examiner

HIGH INTENSITY LED ILLUMINATION DEVICE

RELATED APPLICATIONS AND CLAIM OF PRIORITY

This patent document claims priority to U.S. Provisional Patent Application No. 61/917,030, filed Dec. 17, 2013, the disclosure of which is fully incorporated into this document by reference.

The patent document is related to U.S. patent application Ser. Nos. 14/573,521; 14/573,553; 14/573,619; and 14/573,668, each filed Dec. 17, 2014. The disclosures of each related application are fully incorporated into this document by reference.

BACKGROUND

Entertainment facilities such as stadiums, arenas and concert halls seek ways to offer unique experiences with lighting and special effects. However, the current methods of providing such effects through lighting have been limited because of the manual operation required to change colors, intensities and positions associated with overhead light fixtures. In addition, the ability to rapidly change lighting effects is limited due to the significant amount of time that it takes to start and illuminate high intensity discharge fixtures, such as high intensity discharge lamps. Further, because of the amount of light required to be emitted by many stadium lights, the lights may require a significant amount of energy and may generate a substantial amount of heat.

This document describes new illumination devices that are directed to solving the issues described above, and/or other problems.

SUMMARY

In an embodiment, a lighting device includes a light emitting diode (LED) structure having LEDs, a housing, and a power supply. The housing includes an opening that receives and secures the LED structure, a body portion that comprises a heat sink for the LED structure, and a shroud that at least partially shields the LED structure. The heat sink comprises various fins that extend away from the LED module in a direction that is perpendicular to a width of the LED structure.

As an example, in one embodiment, a light fixture includes an LED structure. The LED structure may include one or more LED modules, each of which includes a set of LEDs attached to a substrate. The substrate includes a support material and a plurality of conductive elements. The light fixture also includes a housing that includes an opening that receives and secures the LED structure, as well as a body portion that provides a heat sink for the LED structure. The body portion includes fins that extend away from the LED structure, optionally in a direction that is perpendicular to a widest dimension of the LED structure. The light fixture also includes a shroud that at least partially shields the LED structure, and a power supply that is attached to an area of the body portion that is distal from the LED structure.

Optionally, the opening may be circular, and each LED module may be semi-circular. The shroud may have a varying width so that it includes a top portion that is wider than a bottom portion of the shroud.

Optionally, the fins may be oriented in a substantially vertical direction. The housing may include one or more lateral supports that are each interconnected to two or more of the fins, and the fins and lateral supports may provide a grate through which precipitation may fall and hot air may rise. The opening and heat sink may be configured so that during operation, heat generated by the LEDs will rise and dissipate through the heat sink, creating a negative pressure that draws ambient air into the housing via the opening.

As another option, the body portion may exhibit a semi-hemispherical shape and include: (1) a first segment having a portion of a supporting structure that secures the LED structure in the opening; (2) a second segment having another portion of the supporting structure that secures the LED structure in the opening; and (3) a connecting structure that connects the first segment and the second segment.

The body portion may include a receptacle for the power supply, and the power supply may be removably attached to the body portion via the receptacle. The power supply may include a housing with fins having a longest dimension that is configured to extend away from the LED structure. A thermal insulating structure may be configured to connect the power supply to the housing, and/or thermally insulate the power supply from the housing.

Optionally, the light fixture may include a support structure that includes a base or mounting yoke, and one or more connectors that connect the housing to the support structure. It may also include a communication device configured to receive control signals from an external source via a wireless communication protocol. It may also include an attached laser pointer that, when activated, directs a beam to a distal point in environment that the light fixture will illuminate during operation.

Optionally, the light fixture may include a lens cover that includes a set of lenses, each of which is configured to be positioned over an LED of the LED structure. In some embodiments, the light fixture may include a circuit board for controlling the lenses, and the lens cover also may include an area with no lenses that will cover the circuit board.

In an alternate embodiment, a light fixture includes an LED structure having a plurality of LED modules. Each LED module includes a set of LEDs attached to a supporting substrate. The light fixture also includes a housing with an opening that receives and secures the LED structure, and a body portion that provides a heat sink for the LED structure. The body portion includes a set of fins that are oriented in a substantially vertical direction and that extend away from the LED structure in a direction that is perpendicular to a widest dimension of the LED structure. The body portion also includes one or more lateral supports that are each interconnected to two or more of the fins. The fins and lateral supports provide a grate through which precipitation may fall and hot air may rise.

Optionally, the alternate embodiment may include a shroud that is connected to the housing and which at least partially shields the LED structure. If the opening is circular, the shroud may have a varying width so that it includes a top portion that is wider than a bottom portion of the shroud.

Optionally, the body portion may exhibit a semi-hemispherical shape and include a first segment having a portion of a supporting structure that secures the LED structure in the opening, a second segment having another portion of the supporting structure that secures the LED structure in the opening, and a connecting structure that connects the first segment and the second segment.

Optionally, the light fixture may include a power supply. If so, the body portion may include a receptacle for the power supply, and the power supply may be removably attached to the body portion via the receptacle. The receptacle may be positioned to removably attach the power supply to an area of the body portion that is distal from the LED structure. The power supply may include a housing having a plurality of fins having a longest dimension that is configured to extend away from the LED structure. A thermal insulating structure may be configured to connect the power supply to the housing, and/or thermally insulate the power supply from the housing.

Optionally, the opening and heat sink may be configured so that during operation, heat generated by the LEDs will rise and dissipate through the heat sink, creating a negative pressure that draws ambient air into the housing via the opening.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, the terms "upper" and "lower," as well as "vertical" and "horizontal," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

Figure 1:
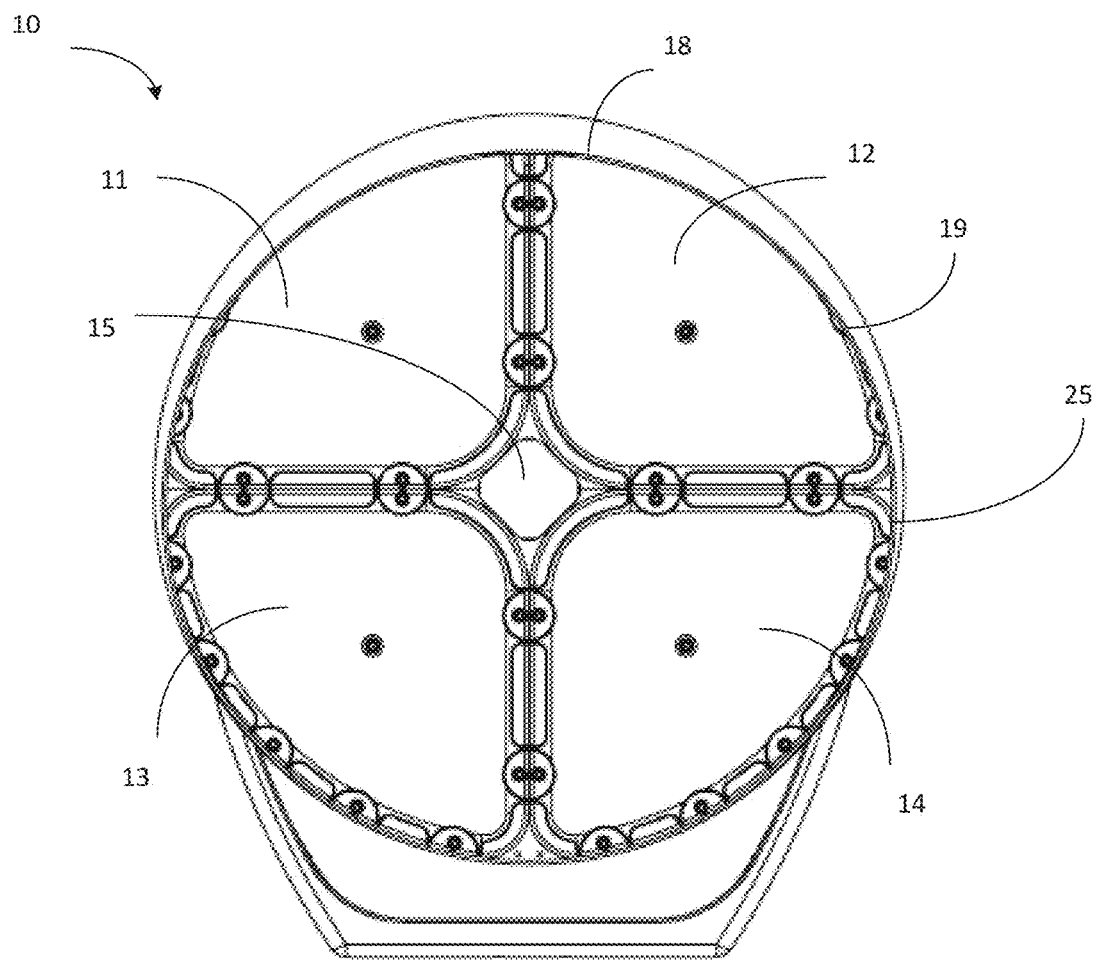
FIG. 1 illustrates a front view of an example of one embodiment of the illumination devices disclosed in this document.
Figure 2:
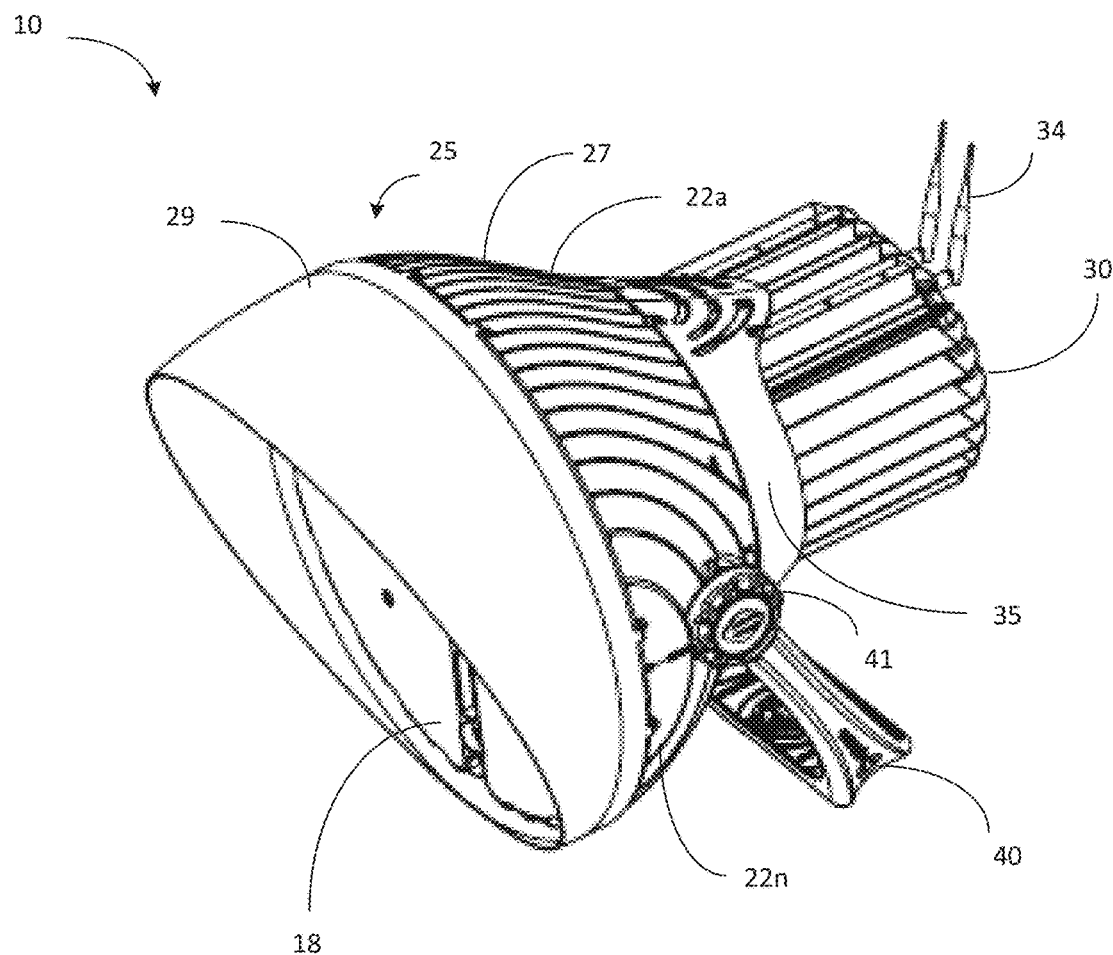
FIG. 2 illustrates a perspective view from a first side of the device of FIG. 1.
Figure 3:
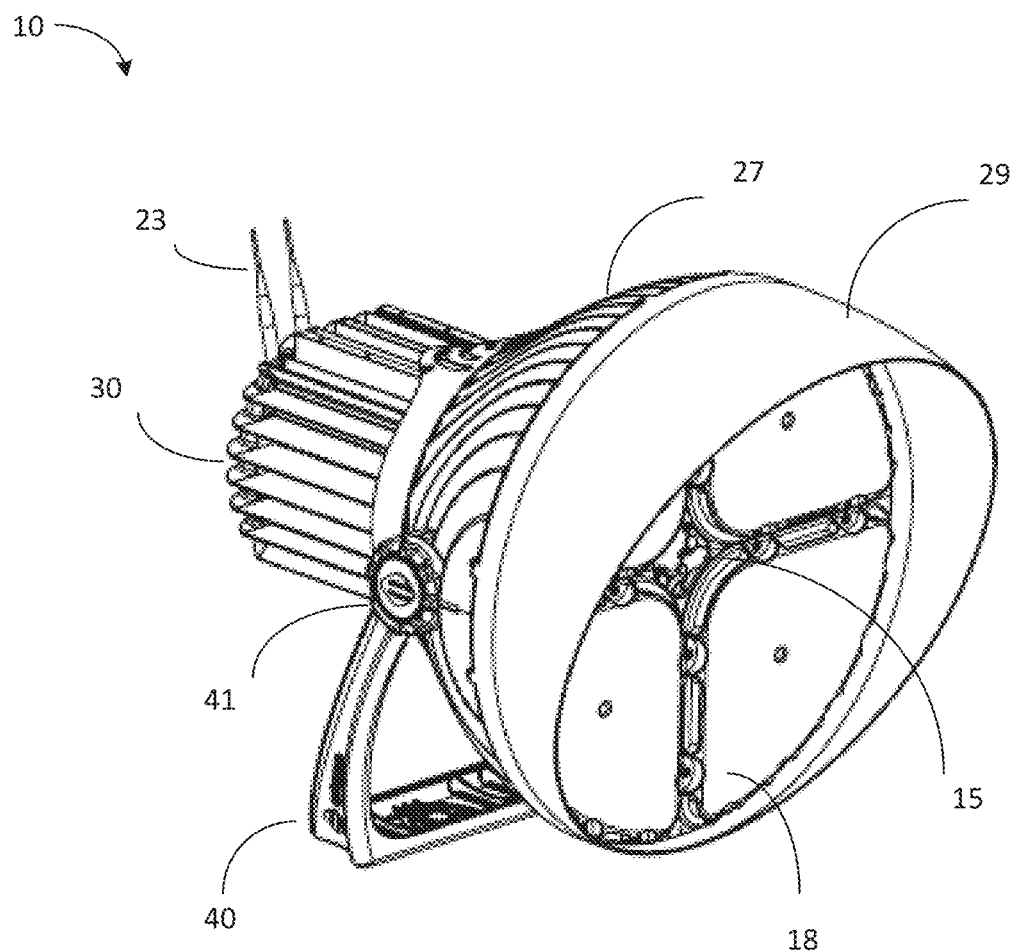
FIG. 3 illustrates a perspective view from a second side of the device of FIG. 1.

FIG. 1 illustrates a front view of an example of one embodiment of the illumination devices disclosed in this document. FIG. 2 illustrates a perspective view from one side of the device of FIG. 1, while FIG. 3 illustrates a perspective view from the opposite side of the device of FIG. 1. The illumination device 10 includes a housing 25 that encases various components of a light fixture. The housing 25 includes an opening in which a set of light emitting diode (LED) modules 11-14 are secured to form a multi-module LED structure 18. The LED modules 11-14 are positioned to emit light away from the fixture. Each LED module includes a frame that holds a set of LEDs arranged in an array or other configuration, and in various embodiments the set of LEDs may be of a number that is sufficient to provide a high intensity LED device.

The opening also provides a sensor compartment 15 in which one or more sensors may be installed to detect information about the environment exterior to the device. The sensors included in the sensor compartment may include sensors that are configured to ambient temperature, or properties of light such as color rendering index (CRI), $D_{uv}$, color temperature (CCT), intensity or other properties of light in the ambient area in front of the LED modules 11-14. Optionally, the sensor compartment 15 may be fully enclosed in a housing to protect the sensors from rain and dust, or at least some of the compartment may include an opening to ambient air. Optionally, some or all of the sensors may be positioned in the LED modules instead of or in addition to the sensor compartment.

Optionally, the fixture may include one or more reflectors 19, such as mirrors or other reflective substrates, positioned and angled to reflect some of the light emitted by the LED modules toward the sensor compartment 15. The reflectors 19 are reflective structures that may be attached to the housing 25, the shroud 29 (described below), any of the LED modules 11-14, or any other suitable component of the fixtures. In this way, the sensor(s) may be positioned at or near the same plane as the LEDs, rather than substantially above the plane.

The opening of the housing 25 may be circular as shown, with the sensor housing 15 positioned at the center of the circle and the LED modules 11-14 positioned around the central open section to form a ring-shaped overall LED structure, although other shapes and configurations are possible. The LED modules 11-14 may include four modules, each of which is positioned in a quadrant of the circle as shown. Alternatively, any other number of LED modules, such as one, two, three, five or more LED modules, may be positioned within the opening in any configuration.

The device's housing 25 includes a body portion 27 and an optional shroud portion 29. The body portion 27 serves as a heat sink that dissipates heat that is generated by the LED modules. The body/heat sink 27 may be formed of aluminum and/or other metal, plastic or other material, and it may include any number of fins 22a . . . 22n on the exterior to increase its surface area that will contact a surrounding cooling medium (typically, air). Thus, the body portion 27 may have a bowl shape (i.e., semi-hemispherical) as shown, the LED structure 18 may fit within the opening of the bowl, and heat from the LED modules 11-14 may be drawn away from the LED structure and dissipated via the fins 22a . . . 22n on the exterior of the bowl.

The body 27 may be formed as a single piece, or it may be formed of two pieces that fit together as in a clamshell-type structure as shown. In a clamshell design, a portion of the interior wall of the clamshell near its opening may include a groove, ridge, or other supporting structure that is configured to receive and secure the LED structure in the opening when the clamshell is closed. In addition, the fins $22a \ldots 22n$ may be curved or arced as shown, with the base of each fin's curve/arc positioned proximate the opening/LED modules, and the apex of each fin's curve/arc positioned distal from the opening/LED modules to further help draw heat away from the LED modules.

Typically, any openings of the housing 25 will be sealed with a weatherproofing material such as rubber or silicone. In addition, the housing may include a shroud 29 that extends from the body 27 and beyond the LED modules. The shroud may be semi-circular in shape when the multi-module LED structure is circular, and it may be angled or shaped to shield an upper portion of the light assembly from rain while directing, focusing and/or reflecting light so that the light is concentrated in a desired direction (e.g., downward). In this way, the housing 25 may provide a dust-resistant and water-resistant housing that protects electronic components of the illumination device. This may be sufficient to meet the standards required to provide a National Electrical Manufacturers Association (NEMA) type 1 or type 2 enclosure. For outdoor installations, the housing may sealed to provide a NEMA type 3 enclosure.

While the LED structure is positioned at one side of the body 27, the opposing side of the body may include a power supply 30. The power supply 30 may include a battery, solar panel, or circuitry to receive power from an external and/or other internal source. As shown, the external housing of the power supply 30 also may include fins to help dissipate heat from the power supply. The fins of the power supply may have a longest dimension that extends away from the LED structure (i.e., perpendicular to the widest dimension of the LED structure) to help with heat dissipation. Power wiring may be positioned within the body 27 to convey energy from the power supply 30 to the LED array modules 11-14. The power supply 30 may extend from the rear of the housing as shown, or it may be placed into the housing so that it is flush or substantially flush with the rear of the housing 25, or it may be configured to extend to some point between being flush with the housing 25 and the extended position of the configuration shown in FIG. 2.

The housing may be attached to a support structure 40, such as a base or mounting yoke, optionally by one or more connectors 41. As shown, the connectors 41 may include axles about which the housing and/or support structure may be rotated to enable the light assembly to be positioned to direct light at a desired angle.

FIG. 3 helps to illustrate components of the lighting device that can, in some embodiments, have self-cooling effects through its use of a sensor opening 15 in the front of the bowl (which is otherwise covered by the LED structure). When the LED modules operate, heat generated by the LEDs will rise and dissipate through the heat sink, creating a negative pressure that may draw cool ambient air into the housing via an opening that is positioned proximate to (i.e., at, near or around) the sensor compartment 15. This chimney effect helps keep the LED modules and other components cool during operation. FIG. 3 also illustrates that the shroud 29 may have a variable width so that an upper portion positioned at the top of the LED structure 18 is wider than a lower portion positioned at the bottom and/or along the sides of the LED structure. This helps to reduce the amount of light wasted to the atmosphere by reflecting and redirecting stray light downward to the intended illumination surface.

Figure 4:
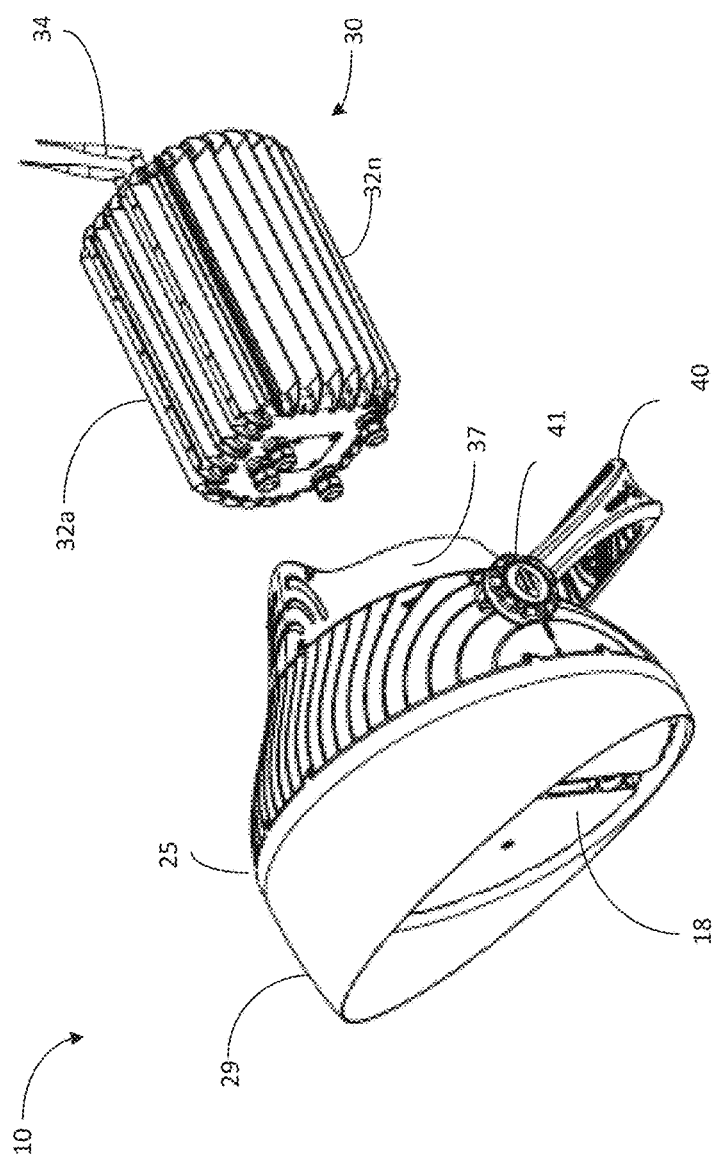
FIG. 4 illustrates a perspective view of the device of FIG. 1 with the power supply detached from the unit.

As shown in FIG. 4, the power supply 30 may be detachable from the lighting device's housing 25 so that it can be replaced and/or removed for maintenance without the need to remove the entire device from an installed location, or so that it can be remotely mounted to reduce weight. In addition, the power supply may include a power supply housing made of a set of fins $32a \ldots 32n$ that are positioned lengthwise along an axis that extends away from the LED array when the power supply is installed in the device. The fins of the power supply housing thus provide an additional heat sink that draws heat away from the power supply during operation. The power supply housing and/or a portion of the lighting unit housing 25 may include one or more antennae, transceivers or other communication devices 34 that can receive control signals from an external source. For example, the illumination device may include a wireless receiver and an antenna that is configured to receive control signals via a wireless communication protocol. Optionally, a portion of the lighting unit housing 25 or shroud 29 may be equipped with an attached laser pointer that can be used to identify a distal point in an environment to which the lighting device directs its light. The laser pointer can thus help with installation and alignment of the device to a desired focal point.

Figure 5:
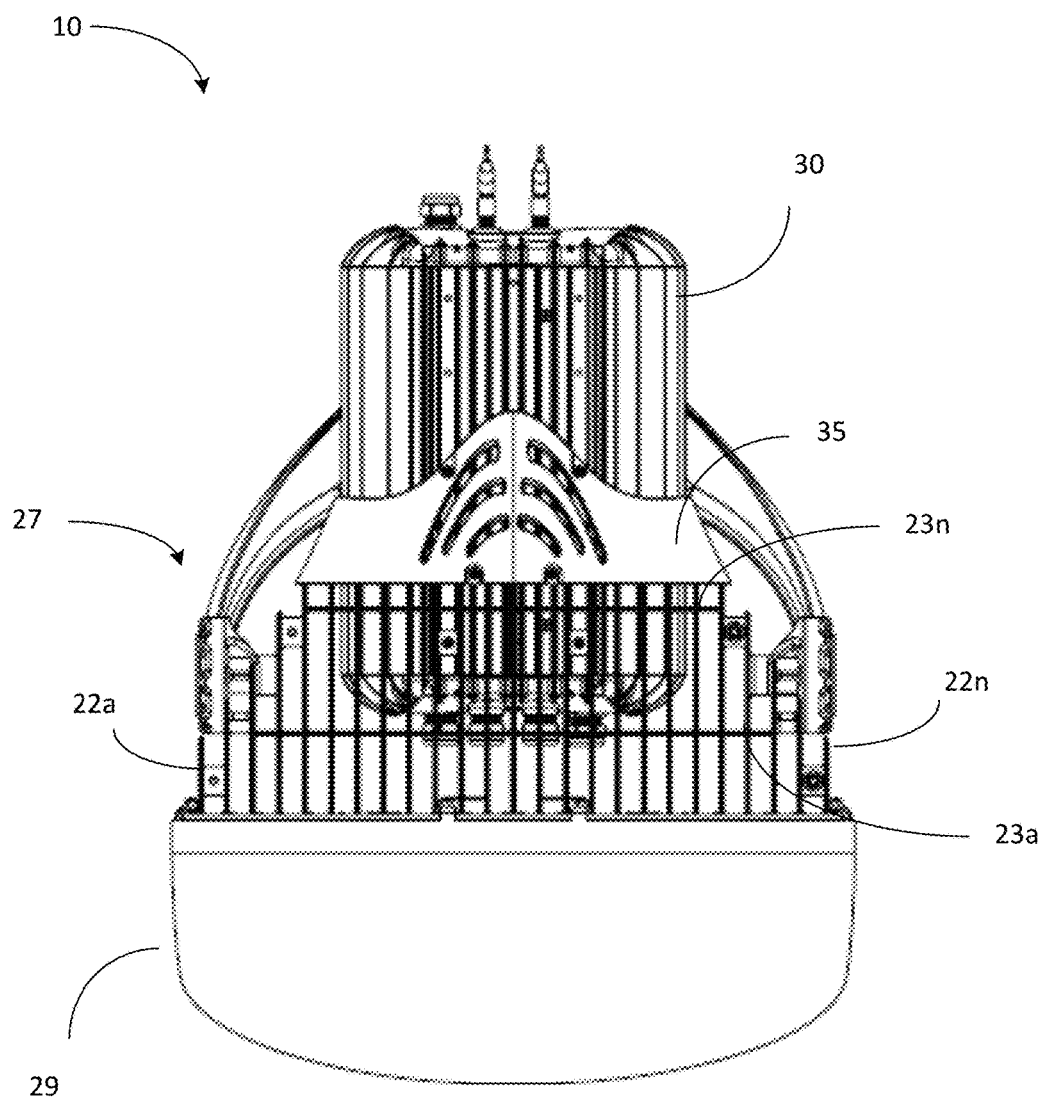
FIG. 5 illustrates a top view of the device of FIG. 1, and shows an embodiment of the housing's fins that provide a heat sink effect.

FIG. 5 illustrates a top view of the device 10 and shows one embodiment of how the heat sink may help to keep the LED structure cool. In some embodiments the housing may be substantially or fully enclosed to provide a dome that receives the LED structure. In other embodiments, such as that shown in FIG. 5, the body portion 27 of the housing may be open so that the fins $22a \ldots 22n$ are positioned to extend away from the shroud 29 at an angle that is substantially perpendicular to the axis of the widest dimension (i.e., supporting panels) of the LED structure and shroud's opening.

The fins $22a \ldots 22n$ may be positioned substantially vertically (i.e., lengthwise from a top portion of the LED array structure and shroud 29 to a bottom portion of the same). Optionally, one or more lateral supports $23a \ldots 23n$ may be interconnected with the fins to provide support to the housing. The lateral supports $23a \ldots 23n$ may be positioned substantially parallel to the axis of the widest dimension of the LED structure as shown, or they may be curved to extend away from the LED structure, or they may be formed of any suitable shape and placed in any position. Each support may connect two or more of the fins. In this embodiment shown in FIG. 5, the fins and optional supports $23a \ldots 23n$ form the body portion 27 as a grate, and hot air may rise through the spaces that exist between the fins and supports of the grate. In addition, precipitation may freely fall through the openings of the grate. In addition, any small debris (such dust or bird droppings) that is caught in the grate may be washed away when precipitation next occurs.

Figure 6A:
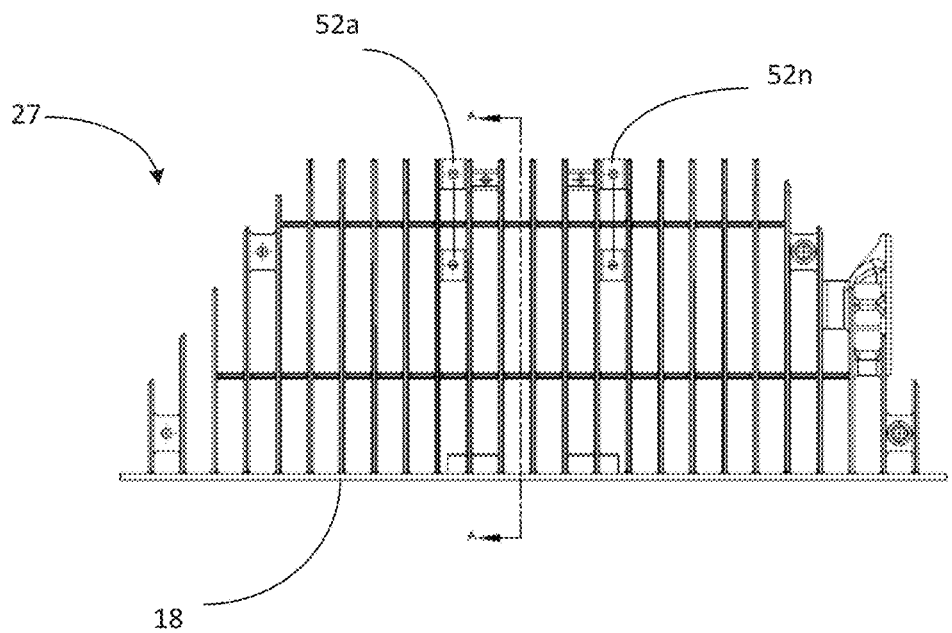
FIGS. 6A and 6B illustrate an example of a heat sink body portion.

FIG. 4 shows that a thermal insulating structure 37 may be positioned in the body and may receive the power supply so that the power supply is secured to the body but thermally separated from the body. The thermal insulating structure 37 may be a structure that provides a barrier or wall, a plate, a ring that separates the fins of the body from those of the power supply, or any other suitable configuration. The thermal insulating structure may be made of any suitable insulating material, such as a ceramic material. FIG. 5 also shows that the insulating structure may have a central opening so that the power supply 30 may be received into the body 27 via a receptacle 35. The receptacle 35 may have inner dimensions that are at least as large as those of the power supply's housing. The receptacle and/or any portions of the body 27 may removably secure the power supply 30 in place by friction and/or by or more connectors such as clips, hooks, bolts or other connecting structures. For example, as shown in FIG. 6A, the body 27 may have a number of anchors 52a . . . 52n that receive and secure one or more connectors of the power supply. Returning to FIG. 5, the power supply 30 may include one or more plugs, wires or other connectors so that the supply can deliver power to the LED structure. Note that the power supply 30 is optional and need not be part of the lighting device. The lighting device can be connected to an external power source by one or more wires, plugs, busses or other conductors.

Figure 6B:
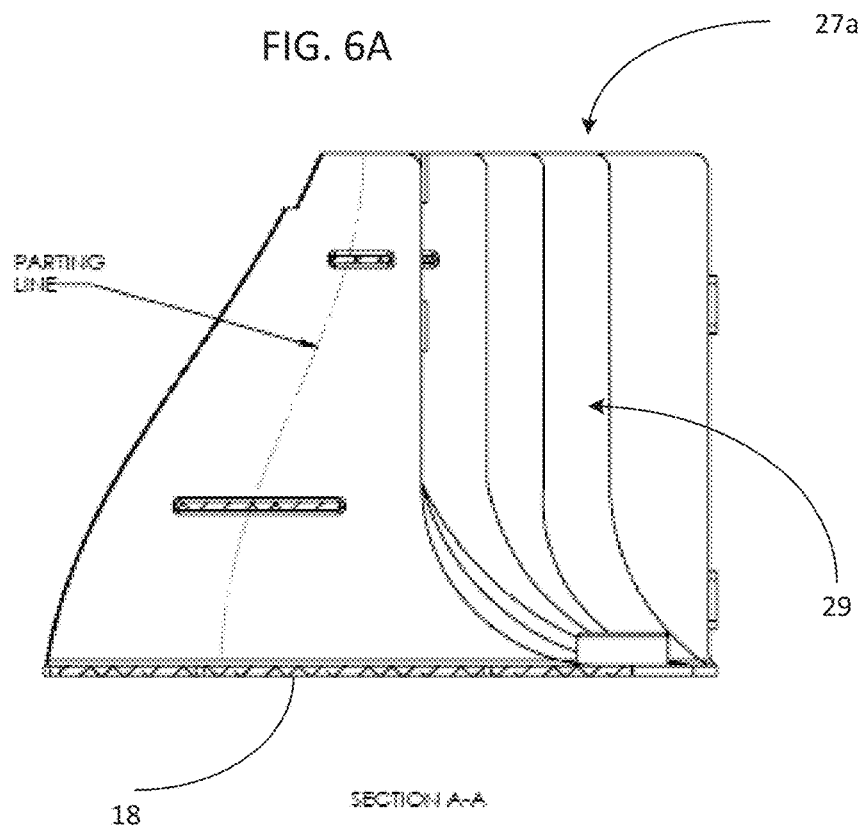
Figure 7:
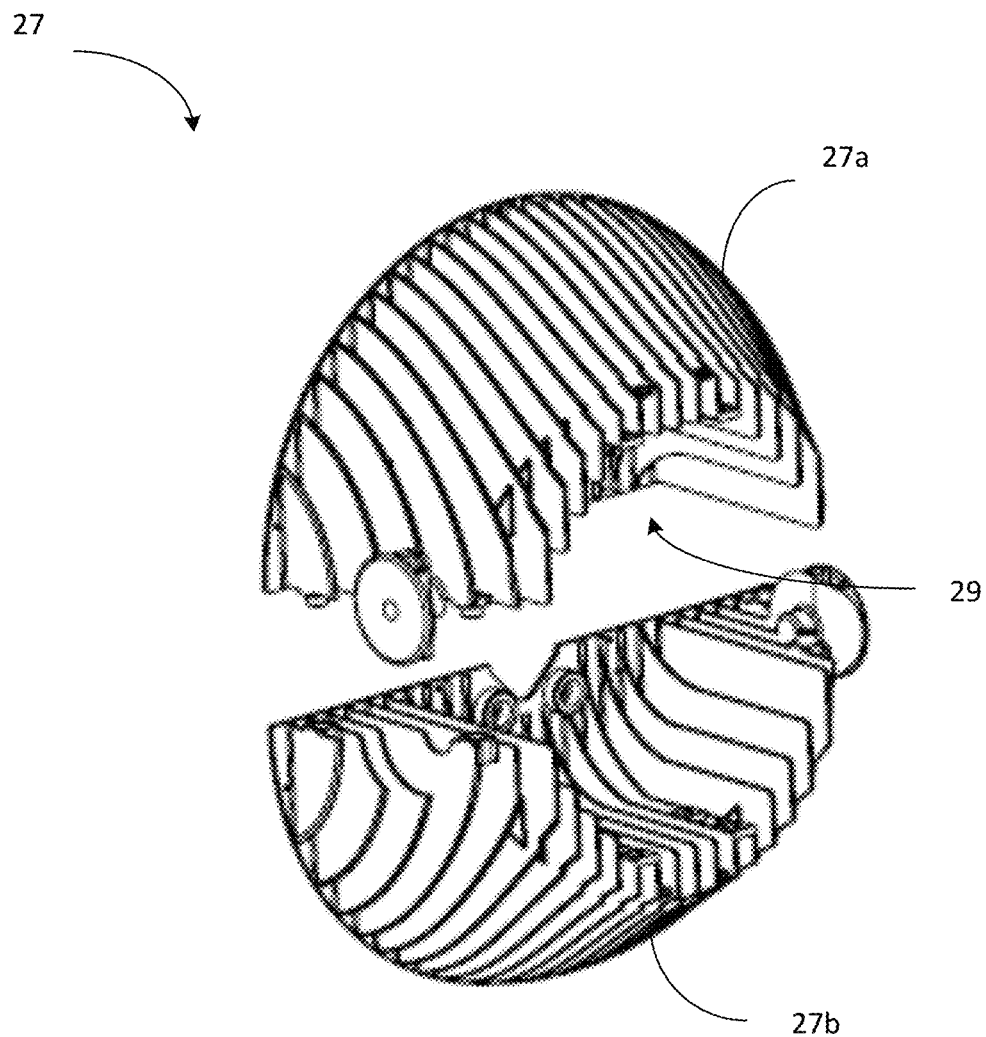
FIG. 7 illustrates an embodiment of a clamshell-type housing for a body portion of the device of FIG. 1.

The illustration of FIG. 6A also illustrates a cross section A-A. FIG. 6B shows a side view of this cross section in a top half 27a of the body, with the uppermost portion of the body portion illustrated to the right in FIG. 6B, and the lower section of the body portion illustrated to the left in FIG. 6B. As illustrated in FIG. 6B, the fins of the cross-section sweep away from the LED structure 18, and form a cavity 29 within the body to provide a heat sink. The rightmost portion 27a may be connected to a lower body portion as illustrated in FIG. 7. The fins and connecting structures of the body portion 27 are made of a durable yet lightweight material, such as aluminum, an aluminum alloy such as A380 or ADC12, or other materials.

Figure 8:
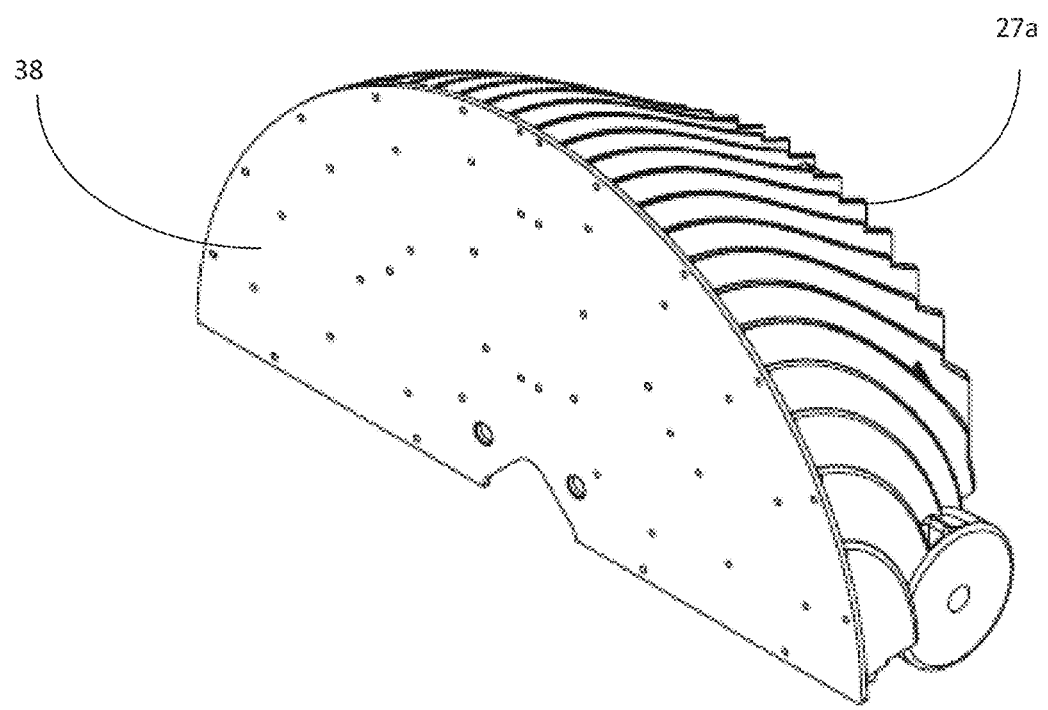
FIG. 8 illustrates how a body portion of the device of FIG. 1 may receive a portion of a light emitting diode (LED) array structure.

FIG. 7 illustrates that the housing 27 may be formed of two or more molded sections 27a, 27b that fit together as a clamshell-type structure. Each section 27a, 27b may include one or more pins, receptacles, clips, or other receiving structures that help align and/or secure the sections together when positioned in place and connected to the shroud and/or power supply receptacle (shown in other Figures). The two sections 27a, 27b form a cavity 29 within the body when connected. FIG. 8 illustrates that each housing section 27a may form part of the opening in which the LED structure resides. Each LED module of the LED structure may include one or more conducting substrates 38 that serve to hold the LEDs in place and provide the primary cooling path to the LEDs. The substrates may be made of any support material (such as fiberglass or aluminum) with conductive elements (such as traces, bars or wires) placed thereon or therein to direct power to the LEDs. FIG. 8 also illustrates an embodiment in which two LED modules form the LED structure, and each LED module is configured in a half-circle configuration. Thus, with a circular opening, the LED modules may be semi-circular in shape so that two, three, four or more of them together form a circle that fits within the opening.

Figure 9:
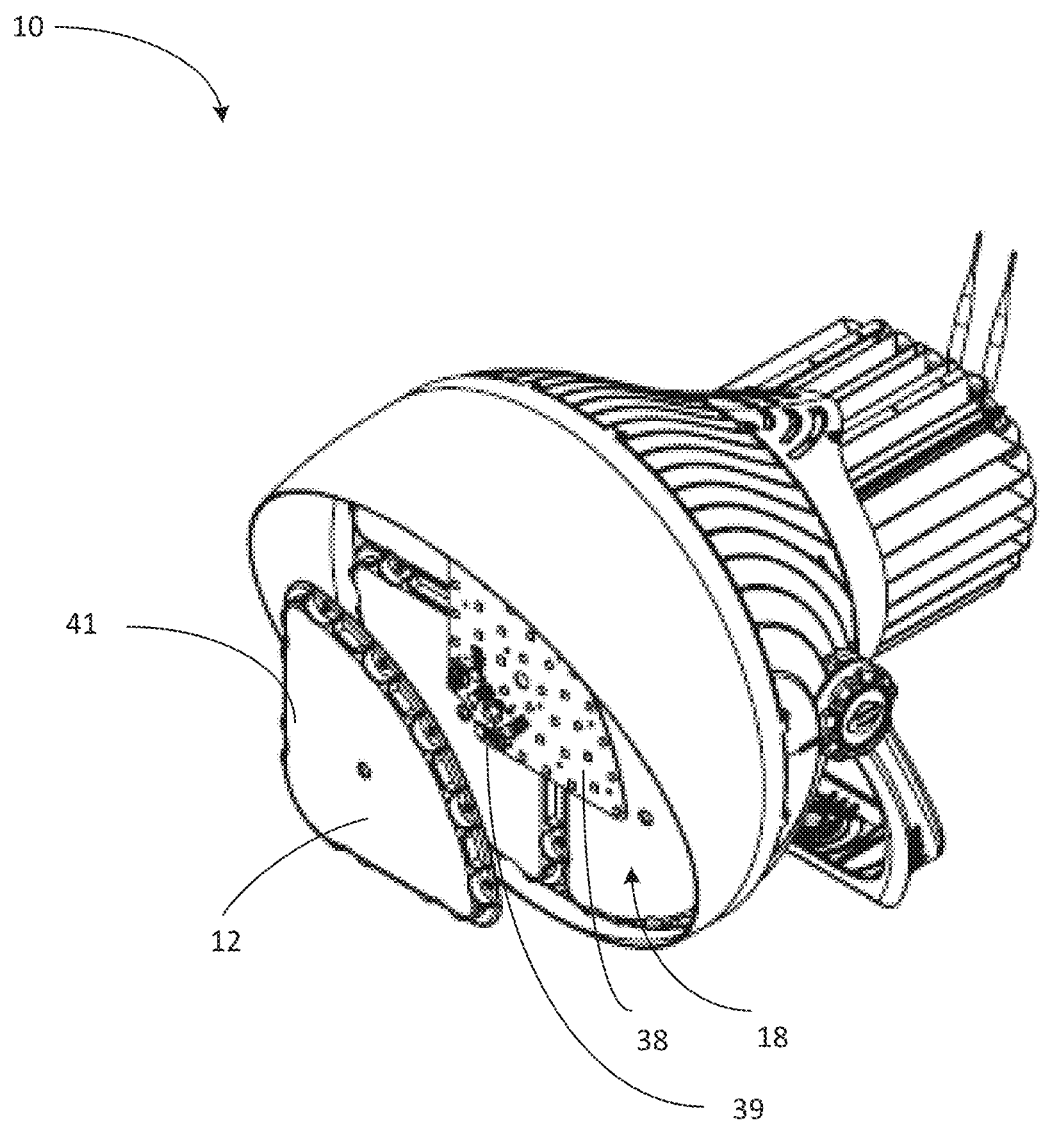
FIG. 9 illustrates an embodiment of the device with an expanded view of an LED module.

FIG. 9 illustrates an embodiment of the device, with an expanded view of one of the LED array modules 12 of the LED structure 18. As shown, the module 12 includes a conductive substrate 38 on which a number of LEDs 39 are positioned. The LEDs 39 may be arranged in one or more rows, matrices, or other arrangements with corresponding components supported in place and/or spaced apart by supports. For example, the LEDs may form matrices of n×n LEDs, such as 4×4 or 8×8 matrices. Alternatively, as shown in FIG. 9, the LEDs in each module 12 may be positioned in curved rows so that when all modules are positioned within the opening, the LED structure 18 comprises concentric rings of LEDs. The grouping of LEDs for the purpose of power supply and control may or may not conform to the arrangement of the LEDs in rings, clusters, matrices or other groupings. The substrate 38 may include a portion that is a printed circuit board. Driver circuitry on the circuit board may deliver current to the LEDs, and the LED array modules may include multi-wire connectors with prongs and/or receptacles for connecting to external conductors and/or signal wires, or other LED array modules. A lens cover 41 may be positioned over the substrate 38 to protect the substrate 38 and LEDs 39 from the ambient elements, as well as to focus and/or direct light emitted by the LEDs 39.

Figure 10A:
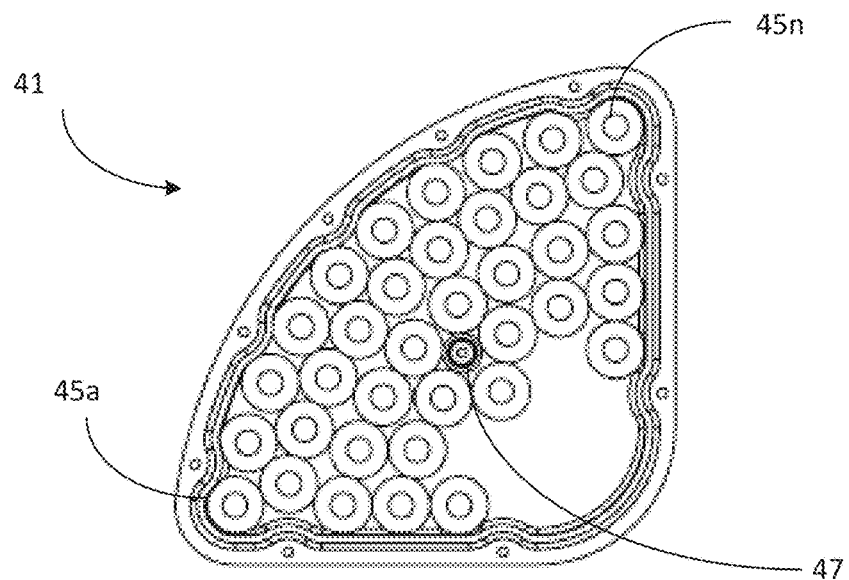
FIGS. 10A and 10B illustrate a lens cover for an LED module.
Figure 10B:
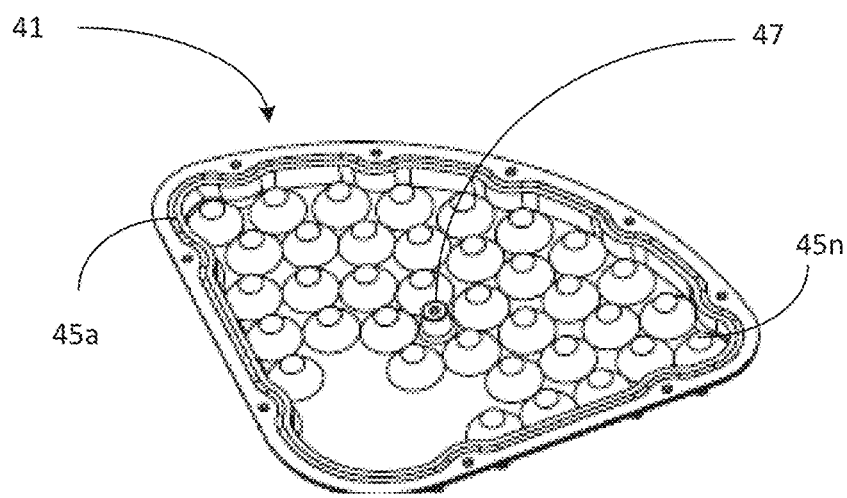

FIGS. 10A and 10B illustrate an underside of an embodiment of a lens cover 41. As shown, the lens cover 41 includes a set of lenses 45a . . . 45n, each of which is positioned to fit over an LED that has been placed on the substrate. The LEDs, and thus the lenses, may form an array. Optionally, more than one LED may share a lens. The spacing of LEDs (and thus the lenses) with respect to each other may vary based on the size of the LEDs. As shown in FIG. 10B, each lens 45a . . . 45n may be dome-shaped, with the apex of each dome being flat or concave to receive light from the corresponding LED, and the larger part of each dome being positioned on the outer side the cover to direct the light. The standoff and slope of each dome may vary depending on the desired beam angle that is to be achieved by the lighting device. For example, a lighting system may be provided with domes of at least six different shapes to correspond to various beam limiting (collimating) standards. Alternatively, the LEDs may be domeless and/or equipped with other lens structures.

FIGS. 10A and 10B illustrate an optional area of the lens cover 41 on which no lenses appear. This may be the case of a portion of the lens cover 41 covers an area of the substrate that contains no LEDs, or in areas where no lenses are desired to be positioned over the LEDs. For example, the substrate may include a printed circuit board that provides control functions. If so, then the lens cover 41 will not need to include lenses in that area, and it may instead simply be a solid cover over those portions of the substrate. Alternatively, one or more LEDs may be equipped with no domes over the LEDs so that the beam is not limited, or one or more LEDs may be equipped with a channel 47 that serves as a collimator to focus the beam of light from its associated LED. In addition, LEDs are normally manufactured with a primary lens. In some embodiments, the dome lenses 45a . . . 45n may be added as secondary lens structures over the LEDs' primary lenses. In other embodiments, LEDs with no primary lens may be used, in which case the dome lenses 45a . . . 45n may serve as the only lens for one or more of the LEDs. When dome lenses 45a . . . 45n are used, they may be spaced apart from each other, adjacent to each other as shown in FIGS. 10A and 10B, configured so that their bases slightly overlap, or in any combination of such positioning options. In situations where the bases overlap, a small amount of overlap may be selected to help reduce glare from the LED assembly during operation. The amount of overlap may be any suitable amount, such as approximately 2% of the base area of each dome, approximately 3% of the base area of each dome, approximately 5% of the base area of each dome, approximate 7% of the base area of each dome, approximately 10% of the base area of each dome, any range between the percentages listed above, or other percentages.

Figure 11:
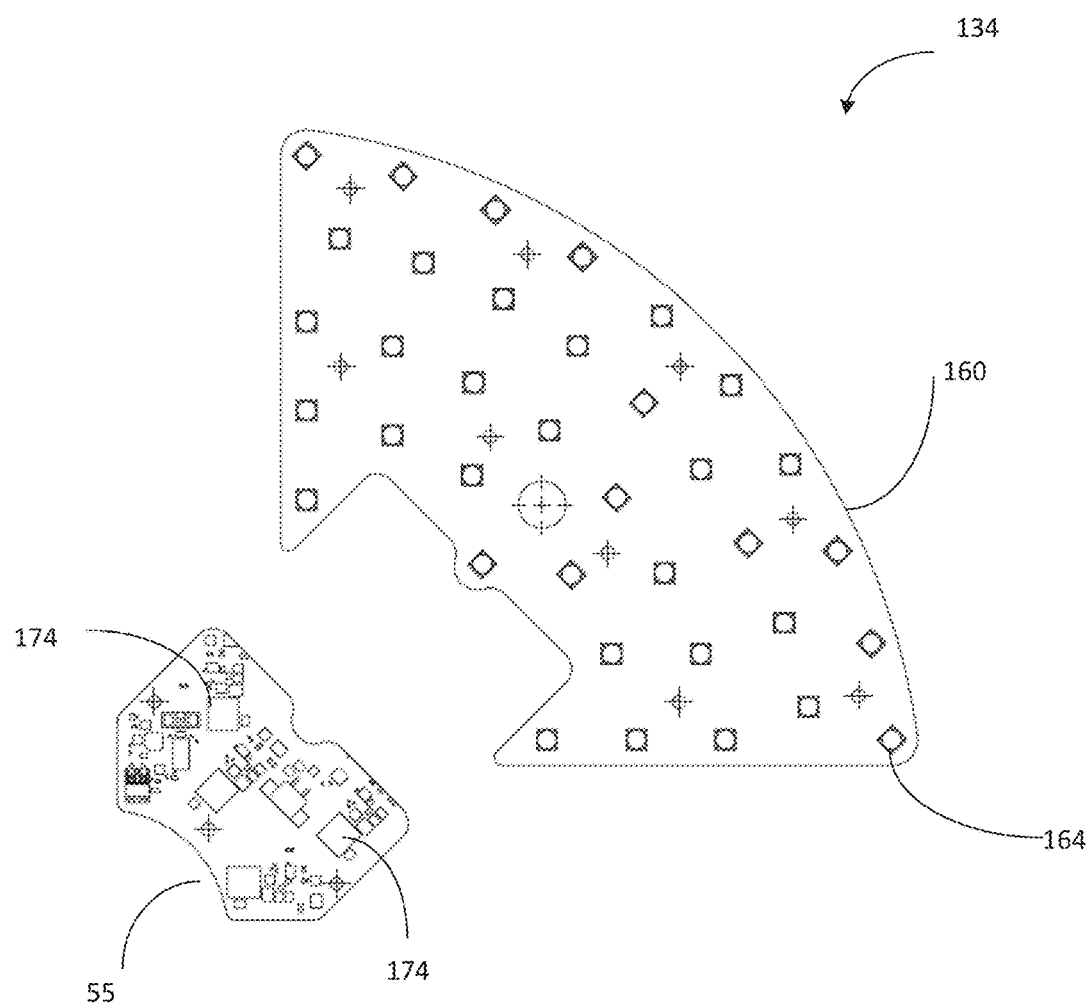
FIG. 11 illustrates an example of an LED array on a substrate, with a control card.

FIG. 11 illustrates an example of a portion of an LED module 134. The LED module includes any number of LEDs 164. The LEDs may be arranged in rows, matrices, or other arrangements with corresponding components supported in place and/or spaced apart to form modules of any number of LEDs. The LEDs may be arranged and mounted on a circuit board 160. Driver circuitry on the circuit board 160 may deliver current to the LEDs, and the LED array modules may include multi-wire connectors with prongs and/or receptacles for connecting to external conductors and/or signal wires, or other LED modules.

One or more circuit control cards 55 may be positioned under, adjacent to or otherwise near the LED modules to provide power to the LEDs. The LEDs to which power is supplied may be selectively controlled by control circuitry such as that described below in this document. The control card may include a supporting substrate made of a material such as fiberglass, and a non-transitory computable-readable memory for storing programming instructions and/or monitored data and/or operational history data, one or more processors, a field programmable gate array (FPGA), application specific integrated circuit (ASIC) or other integrated circuit structures, and a received for receiving control signals from an external transmitter. The LED module 134 and control card 55 may be placed within an opening of one end of the housing body.

The circuitry of the control card 55 and or the LED module 134 may operate to maintain a constant current draw across the LEDs and automatically adjust the intensity of the emitted light in response to feedback collected by the sensors. For example, each LED module 134 may be arranged so that groups of LEDs are electrically connected in series. Each group may be served by a programmable system on a chip (SoC) 174 which serves to receive a command from telemetry and send duty cycle information to multiple strings of LEDs.

Under ordinary operation, the system may include one or more power supplies, each of which applies a default direct current (DC) voltage (e.g., 36 volts or 48 volts) to an LED group, and each LED in any given group may have a constant voltage drop across it. Each string of LEDs may comprise a set of LEDs connected in series, so that the string maintains the circuit if one bulb should fail. The system may include sensors that monitor current and/or voltage drop across each series, or across individual LEDs in a series. If the values monitored by these sensors change, it may indicate that one or more LEDs in a string has failed. For example, if string includes five bulbs connected in parallel, each of which is rated at 2 amps (A) each, an applied current of 10 A will be divided equally across each bulb. If one bulb fails, the hardware may maintain the circuit, and the voltage drop across the string may occur, thus changing the intensity of light output by the device.

To protect against this, if any of the sensors detects that the voltage across a string has dropped by more than a threshold amount (indicating that a bulb has failed), the control card may generate a command to adjust the drive current across that string to compensate for the lost bulb. The control card may do this by any suitable means, such as by adjusting a variable resistor that is connected in the power delivery circuit, or by causing a variable transformer to reduce the voltage, or by implementing a command on a programmable system on a chip. The system may also selectively control the remaining LEDs using pulse width modulation, as will be described in more detail below. These methods can help to maintain the overall light output by the group of LEDs at a constant intensity, and the detected light at a desired illuminance level, even if one or more LEDs in a series may fail.

Alternatively, the sensors may include light intensity sensors, CRI sensors, CCT sensors, $D_{uv}$ sensors, and/or ambient air temperature sensors. The control card may be programmed to receive data from the sensors and selectably control the LEDs to maintain a desired light output when it determines that measured light intensity, CRI, CCT, $D_{uv}$, or ambient air temperature exceeds or falls below a threshold. The threshold may be a value, or it may be a range of values with an upper and lower value. Optionally, the threshold may be a time-sensitive threshold, such as a threshold amount of change within a certain period of time or a sustained measurement above or below a threshold over a certain period of time.

In an option where the control card controls the LEDs by pulse width modulation (PWM), an oscillating output from the processor repeatedly turns the LEDs on and off by applying a pulsed voltage. Each pulse is of a constant voltage level, and the control circuitry varies the width of each pulse and/or the space between each pulse. When a pulse is active, the LEDs may be turned on, and when the pulses are inactive the LEDs may be turned off. If the duty cycle of the "on" state is 50%, then the LEDs may be on during 50% of the overall cycle of the control pulses. The pulses are delivered rapidly so that the human eye does not detect a strobing effect—at least 24 pulses per second. The control card may dim the lights by reducing the duty cycle—and effectively extending the time period between each "on" pulse—so that the LEDs are off more than they are on. Alternatively, the control card may increase the brightness of the LEDs by increasing the duty cycle.

The control card may receive data from the sensors and apply that data to a rule set to determine whether to increase, decrease, or maintain the intensity of the LEDs. For example, if an ambient air temperature sensor detects that the temperature in the vicinity of the LED array module exceeds a threshold, the control card may cause the LEDs to dim by reducing the voltage output of each transformer and/or reducing the duty cycle of the LEDs in the module. If a light sensor detects that an ambient light level is above a desired range, the control circuitry may automatically reduce the brightness of a group of the LEDs by decreasing a width of voltage pulses applied to the group of LEDs or increasing spacing between voltage pulses applied to the group of LEDs to maintain the ambient light level within the desired range. If the light sensor detects that the ambient light level is above (or below) a desired threshold, the control circuitry may automatically reduce (or increase) increase the brightness a group of the LEDs by reducing (or increasing) a width of voltage pulses applied to the group of LEDs, or by increasing (or decreasing) spacing between voltage pulses applied to the group of LEDs to maintain the ambient light level within a desired range.

Optionally, any LED module may include several LED strings or groups of different colors. For example, a module may include a red (R) LED series, a green (G) LED series, a blue (B) LED series, and a white (W) LED series. If so, the color of light emitted by the unit may be selectably controlled by the control card in response to external commands as described below.

In addition or alternatively, some, all, or portions of the LED modules may include white LEDs of different color temperatures so that they can be selectively driven at different levels to produce variable temperature white light from the same fixture. In addition, any LED module may include various strings or groups, all of which emit white light, but which collectively exhibit a variety of color temperatures. For example, various LED lamps may have strings or other sets of LEDs that exhibit color temperatures ranging from about 2700K to about 6500K, from about 4000K to about 6500K, in a range around 5000K, or other CCT ranges and combinations. In these situations, the control card may automatically alter the drive currents delivered to particular sets of LEDs in order to maintain a desired CCT output by the device.

For example, an illumination device may have a first set of LEDs having a CCT of 4000K and second set of LEDs having a CCT of 6500K. The light fixture control card may include programming to maintain the light emitted by the device at a threshold level or threshold range. When the sensor detects that the emitted light exceeds or falls below the threshold, the control card may implement a process that applies an algorithm, reference a lookup table, or use other suitable methods to determine what drive currents to apply to each of the groups of LEDs to achieve the desired CCT. For example, if the desired output is a CCT of 5000K, the system may drive the 4000K LEDs at a current of 1250 ma and the 6500K LEDs at a drive current of about 900 ma. The same process or a similar process may be applied when the sensor measures $D_{uv}$. The algorithms and lookup table amounts may be set so that the system does not substantially change the illuminance level measured by light intensity sensors in the sensor compartment when the drive current changes are implemented.

The programming on the control card may be programmed in any suitable format, such as in a field programmable gate array (FPGA), or as computer-readable instructions stored in a computer-readable memory device and configured to be read and implemented by a processor of the control card.

Figure 12:
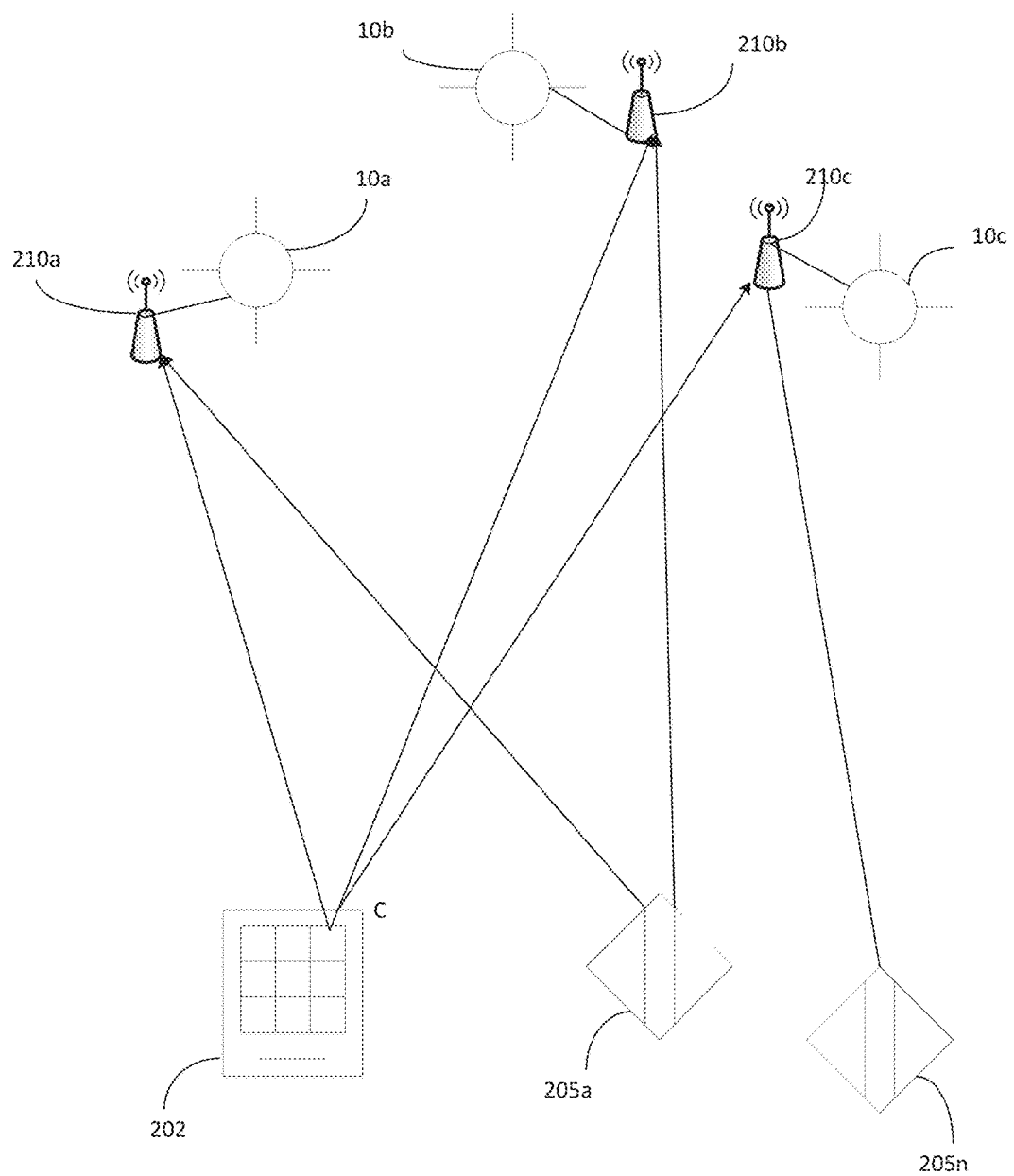
FIG. 12 illustrates an example of a lighting system and control devices for such a system.

FIG. 12 illustrates that any number of lighting devices 10a, 10b, 10c such as those disclosed in this document may be positioned in an environment, such as a wall, ceiling, mast, tower or other supporting structure in a stadium, arena, concert hall, outdoor amphitheater or other location. Each illumination device may include or be connected to a device controller 210(a), 210(b), 210(c) that includes wiring and circuitry to supply power and/or control signals to one or more lights. A device controller may be an external device, or an integral device that includes various components of an illumination device's control card. Each device controller 210(a), 210(b), 210(c) may include a receiver that receives wireless signals from one or more transmitters. The transmitters may be included in, for example, one or more user interface devices 202.

Each interface device 202 may include selectable user inputs, programming, a processor or circuitry, and a transmitter for transmitting command signals to the various illumination devices. For example, the user inputs may include inputs to turn certain lights in a certain zone of an environment on or off, in which case the interface device will generate and send signals with encoded data that instruct the zone's lights to turn on and off. The user inputs also may include brightness level adjustments for one or more zones and/or lights, or scenes that are designed to set various lighting devices at various brightness levels. Each user input command will cause the user interface device to send a signal that includes data indicating which illumination devices should be operated by the signal. When a control device detects a signal that is intended for its illumination device, it will cause its illumination device to execute the command that corresponds to the control signal. The system may do this by adjusting the light intensity using PWM, as described elsewhere in this document.

In addition, any number of external light sensors 205a-205n may be positioned at a location or multiple locations in an environment, such as a stadium playing field, a stage in a concert hall, or a court/floor/ice rink in an area, to detect the intensity of light. The external light sensors may include transmitters that send status information and/or commands to any or all of the illumination device controllers and/or the interface device. For example, a particular illumination device controller 210c may be programmed to detect signals from a particular sensor 205a that is positioned in an area at which the controller's corresponding light fixture 10c directs light. The sensor may sense light intensity in its vicinity and transmit intensity data to the device controller 210c. The device controller 210c may be programmed to increase the LED device's 10c brightness if the local intensity data is less than a threshold, or it may decrease the LED device's 10c brightness if the local intensity data is greater than a threshold. As described above, the controller may do this by increasing or decreasing the frequency of "on" signals that cycle the LEDs on and off by PWM. Alternatively, the sensor 205a itself may include programming and electronics that cause it to send a command to the controller 210c, such as an increase brightness command if local intensity is less than a threshold level or a decrease brightness command if local intensity is greater than a threshold level.

It is intended that the portions of this disclosure describing LED modules and control systems and methods are not limited to the embodiment of the illumination devices disclosed in this document. The LED modules, control systems and control methods may be applied to other LED illumination structures, such as those disclosed in International Patent Application No. PCT/US2012/069442, filed Sep. 13, 2012 by Nolan et al., the disclosure of which is incorporated herein by reference in its entirety.

The features and functions described above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A light fixture comprising:
   a light emitting diode (LED) structure comprising a plurality of LEDs and a circuit board for controlling the plurality of LEDs;
   a housing comprising:
      an opening that receives and secures the LED structure,
      a body portion that provides a heat sink for the LED structure, wherein the body portion comprises a first plurality of fins and that extend away from the LED structure, and
      a shroud that at least partially shields the LED structure,
      wherein:
         the fins are oriented in a substantially vertical direction,
         the housing also comprises one or more lateral supports that are each interconnected to two or more of the fins, and
         the fins and lateral supports provide a grate, wherein the grate comprises a plurality of openings through which precipitation may fall and hot air may rise; and
   a power supply that is attached to an area of the body portion that is distal from the LED structure, wherein a housing of the power supply comprises a second plurality of fins configured to dissipate heat from the power supply; and
   a thermal insulating structure that is positioned to thermally insulate the power supply from the housing.

2. The light fixture of claim 1, wherein the LED structure comprises:
   a plurality of LED modules;
   wherein each of the LED modules includes the plurality of LEDs attached to a substrate comprising a support material and a plurality of conductive elements.

3. The light fixture of claim 2, wherein:
the opening is circular; and
the LED modules are arranged in a circular pattern within the opening.

4. The light fixture of claim 1, wherein:
the shroud has a varying width so that it includes a top portion that is wider than a bottom portion of the shroud.

5. The light fixture of claim 1, wherein the body portion exhibits a semi-hemispherical shape and comprises:
a first segment having a portion of a supporting structure that secures the LED structure in the opening;
a second segment having another portion of the supporting structure that secures the LED structure in the opening; and
a connecting structure that connects the first segment and the second segment.

6. The light fixture of claim 1, wherein the body portion comprises a receptacle for the power supply, and the power supply is removably attached to the body portion via the receptacle.

7. The light fixture of claim 1, wherein each of the second plurality of fins has a longest dimension that is configured to extend away from the LED structure.

8. The light fixture of claim 1, wherein the opening and heat sink are configured so that during operation, heat generated by the plurality of LEDs will rise and dissipate through the heat sink, creating a negative pressure that draws ambient air into the housing via the opening.

9. The light fixture of claim 1, further comprising:
a support structure comprising a base or mounting yoke; and
one or more connectors that connect the housing to the support structure.

10. The light fixture of claim 1, further comprising a communication device configured to receive control signals from an external source via a wireless communication protocol.

11. The light fixture of claim 1, further comprising an attached laser pointer that, when activated, directs a beam to a distal point in an environment that the light fixture will illuminate during operation.

12. The light fixture of claim 1, further comprising a lens cover that comprises a plurality of lenses, each of which is configured to be positioned over an LED of the LED structure.

13. The light fixture of claim 12, wherein the lens cover also comprises an area that does not include lenses and that is positioned to cover the circuit board.

14. A light fixture comprising:
a light emitting diode (LED) structure comprising a plurality of LED modules, wherein each LED module comprises a plurality of LEDs attached to a supporting substrate; and
a housing comprising:
an opening that receives and secures the LED structure, and
a body portion that provides a heat sink for the LED structure, wherein the body portion comprises:
a plurality of fins that are oriented in a substantially vertical direction and that extend away from the LED structure,
one or more lateral supports that are each interconnected to two or more of the fins, wherein an axis of the one or more lateral supports is substantially perpendicular to an axis of the interconnected fins, and
wherein the fins and lateral supports provide a grate, wherein the grate comprises a plurality of openings through which precipitation may fall and hot air may rise.

15. The light fixture of claim 14, further comprising a shroud that is connected to the housing and which at least partially shields the LED structure.

16. The light fixture of claim 15, wherein:
the opening is circular; and
the shroud has a varying width so that it includes a top portion that is wider than a bottom portion of the shroud.

17. The light fixture of claim 14, wherein the body portion exhibits a semi-hemispherical shape and comprises:
a first segment having a portion of a supporting structure that secures the LED structure in the opening;
a second segment having another portion of the supporting structure that secures the LED structure in the opening; and
a connecting structure that connects the first segment and the second segment.

18. The light fixture of claim 14:
further comprising a power supply; and
wherein the body portion comprises a receptacle for the power supply, and the power supply is removably attached to the body portion via the receptacle.

19. The light fixture of claim 18, wherein:
the receptacle is positioned to removably attach the power supply to an area of the body portion that is distal from the LED structure; and
the power supply comprises a housing having a plurality of fins having a longest dimension that is configured to extend away from the LED structure.

20. The light fixture of claim 14, wherein the opening and heat sink are configured so that during operation, heat generated by the plurality of LEDs will rise and dissipate through the heat sink, creating a negative pressure that draws ambient air into the housing via the opening.

21. The light fixture of claim 5, wherein each of the first segment and the second segment have a clamshell shape.

22. The light fixture of claim 17, wherein each of the first segment and the second segment have a clamshell shape.

23. The light fixture of claim 18, further comprising a thermal insulating structure that is positioned to thermally insulate the power supply from the housing.

* * * * *